United States Patent [19]

White

[11] Patent Number: 5,598,727
[45] Date of Patent: Feb. 4, 1997

[54] LOCKS FOR BICYCLES AND THE LIKE

[76] Inventor: Peter A. White, Harrington House, Harrington Road, Altrincham, Cheshire WA14 14QY, Great Britain

[21] Appl. No.: 374,699
[22] PCT Filed: May 19, 1994
[86] PCT No.: PCT/GB94/01076
  § 371 Date: Jan. 25, 1995
  § 102(e) Date: Jan. 25, 1995
[87] PCT Pub. No.: WO94/28275
  PCT Pub. Date: Dec. 8, 1994

[30] Foreign Application Priority Data

May 28, 1993 [GB] United Kingdom ............. 9311099

[51] Int. Cl.$^6$ .................... B62H 5/00; E05B 71/00
[52] U.S. Cl. .................... 70/233; 70/49; 70/234
[58] Field of Search .................... 70/30, 49, 58, 70/233–236

[56] References Cited

U.S. PATENT DOCUMENTS 4,044,577  8/1977  Horlacher .................... 70/234
5,406,257  4/1995  Saito .................... 70/DIG. 49

FOREIGN PATENT DOCUMENTS 802885  9/1936  France .
2947766  8/1980  Germany .
2148248  5/1985  United Kingdom .

Primary Examiner—Steven N. Meyers
Assistant Examiner—Tuyet-Phuong Pham
Attorney, Agent, or Firm—Harold Gell

[57] ABSTRACT

A lock for a bicycle or the like comprises a first fixed casing member which is adapted to be secured to the frame member of a bicycle or the like and a second casing member which is movable relative to the first casing member. The first casing member is cup-shaped and is provided with frame mounting means on the outer surface of the cup wall. A raised boss extends from the base of the cup-shaped member. The second casing member is adapted to fit into the first casing member and to engage with the boss in such a manner that the second member is rotatable with respect to the first member. One end of a wire or cable is secured to the second casing member and the wire or cable is wound around the periphery of the second member. The other end of the wire or cable extends through a slot in the side wall of the first casing member. A lock is provided with which the other end of the wire or cable is engageable and a coil spring is arranged to act on the second casing member, to cause it to rotate with inspect to the first casing member to draw the wire or cable into the first casing member by being wound around the periphery of the second member as the latter is rotated by the coil spring. Visual and audible alarm means are desirably provided which are arranged to be activated if the wire or cable is pulled or cut.

7 Claims, 8 Drawing Sheets

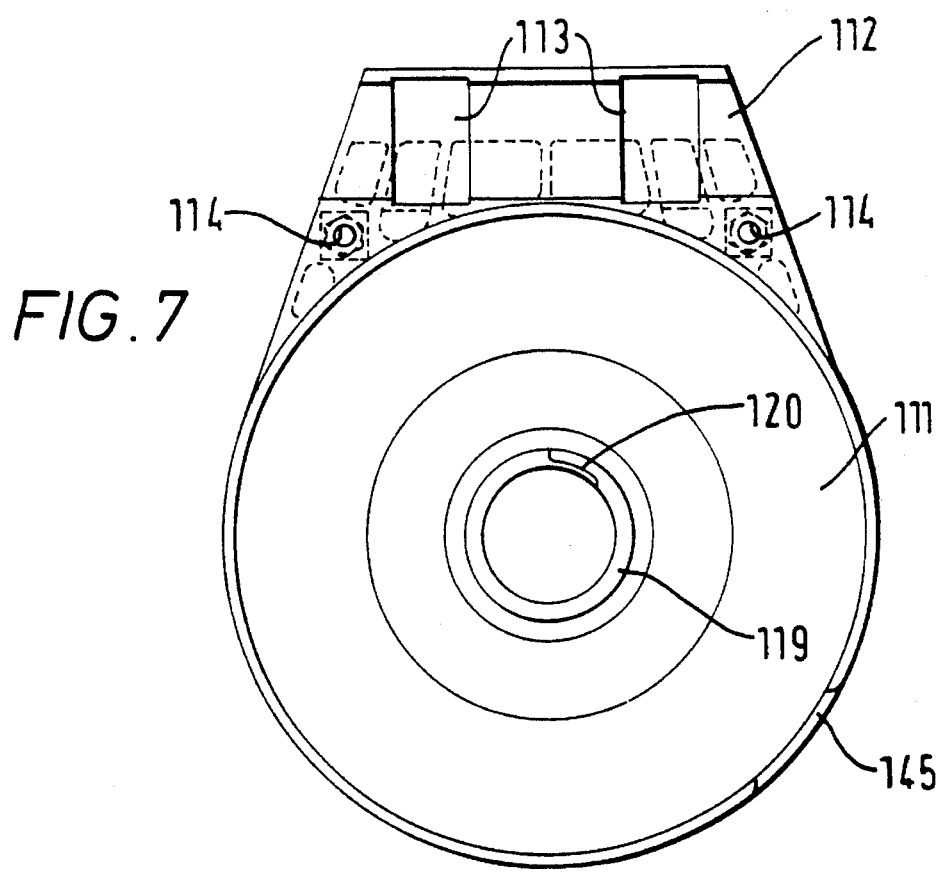
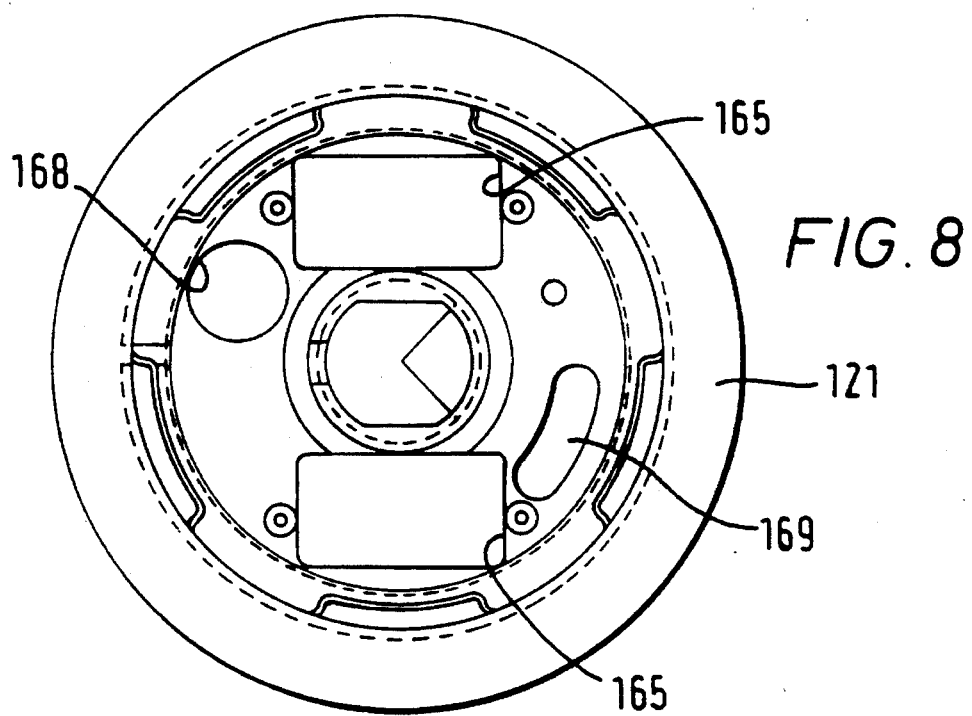

5,598,727

LOCKS FOR BICYCLES AND THE LIKE

This invention relates to improvements in locks for bicycles and the like.

The theft of bicycles is becoming increasingly common and it is necessary either to immobilise a bicycle, for example, by removing one of its wheels and/or by securing the bicycle to a fixed object such as railings by means of a chain and padlock in order to prevent theft. While the removal of a wheel is a fairly effective deterrent against theft, this is time-consuming and it is still necessary to secure the detached wheel in some way to the rest of the bicycle. The other alternative is for the rider to take the wheel away with him or her and this is inconvenient and not always practical.

A separate chain and padlock for securing a bicycle to railings or the like prevents opportune theft but the cyclist has to remember to take the chain and padlock with him or her at all times and there is also the problem of stowing the chain and padlock when the bicycle is being ridden. One attempt at solving these problems has been to provide a casing which is adapted to be secured to a frame member of a bicycle and which contains a wire which is secured at one end to the casing. The wire can be passed around part of the bicycle, for example through one of the wheels and around a frame member, and its other end is provided with means for securing it to the casing by locking means. The locking means is operated by a key. The wire is arranged to be stowed in the casing when not in use and a detachable lid is arranged to be fitted to the casing to retain the stowed wire in the casing.

While this prior arrangement solves a number of the problems associated with securing a bicycle against theft, it has been found that the stowing of the wire in the easing is a fiddly business and can get one's hands dirty when the wire has been used for some time and has not been regularly cleaned. Further, the lid can come off the easing when the bicycle is being ridden and is then either lost or, if secured to the casing, can flap about and cause damage to the paintwork of the bicycle.

The present invention aims to provide a bicycle lock which overcomes the above-mentioned disadvantages.

According to the invention, there is provided a lock for a bicycle or the like which comprises a first fixed casing member adapted to be secured to a frame member of a bicycle or the like and a second casing member which is movable relative to the first casing member; wherein the first casing member is cup-shaped with frame member mounting means provided on the outer surface of the cup wall and a raised boss extending from the base substantially at the centre thereof and the second casing member is adapted to fit into the first casing member and to engage with the boss in such a manner that the second casing member is rotatable with respect to the first easing member; one end of a wire or cable being secured to a central region of the second easing member and the wire or cable then being wound around the periphery of the second casing member when the lock is not in use, the other end of the wire or cable extending through a slot in the side wall of the first easing member, lock means being provided with which the said other end of the wire or cable is engageable and retracting means being provided whereby the second casing member is arranged to rotate with respect to the first casing member to draw the wire or cable into the first casing member by being wound round the periphery of the second casing member as the latter is rotated by the retracting means, and wherein the lock is provided with audible and/or visual alarm means designed to be activated by vibration if attempts are made to move the lock.

Preferably, the boss is formed integrally with the first casing member and lock means are located within the boss. The lock means are desirably arranged to be operated by a key with the slot for the key being accessible from the outside of the first casing member. The lock means may be arranged to rotate with the second casing member.

The retracting member preferably takes the form of a coil spring which is attached at one end to the boss, is wound around said boss and is attached at its other end to the second casing member.

According to a preferred embodiment of the invention, the second casing member takes the form of a circular disc provided with a peripheral flange around which the wire or cable can be wound. The central region of the disc is desirably provided with a raised boss which is engageable with the lock means.

The invention will now be further described, by way of example, with reference to the drawings, in which:

FIG. 7 is a view of a casing member taken in the direction of the arrow A in FIG. 6;

FIG. 8 is a view of a cable drum taken in the direction of the arrow B in FIG. 6;

In the drawings, like parts are denoted by like reference numerals.

Figure 1:
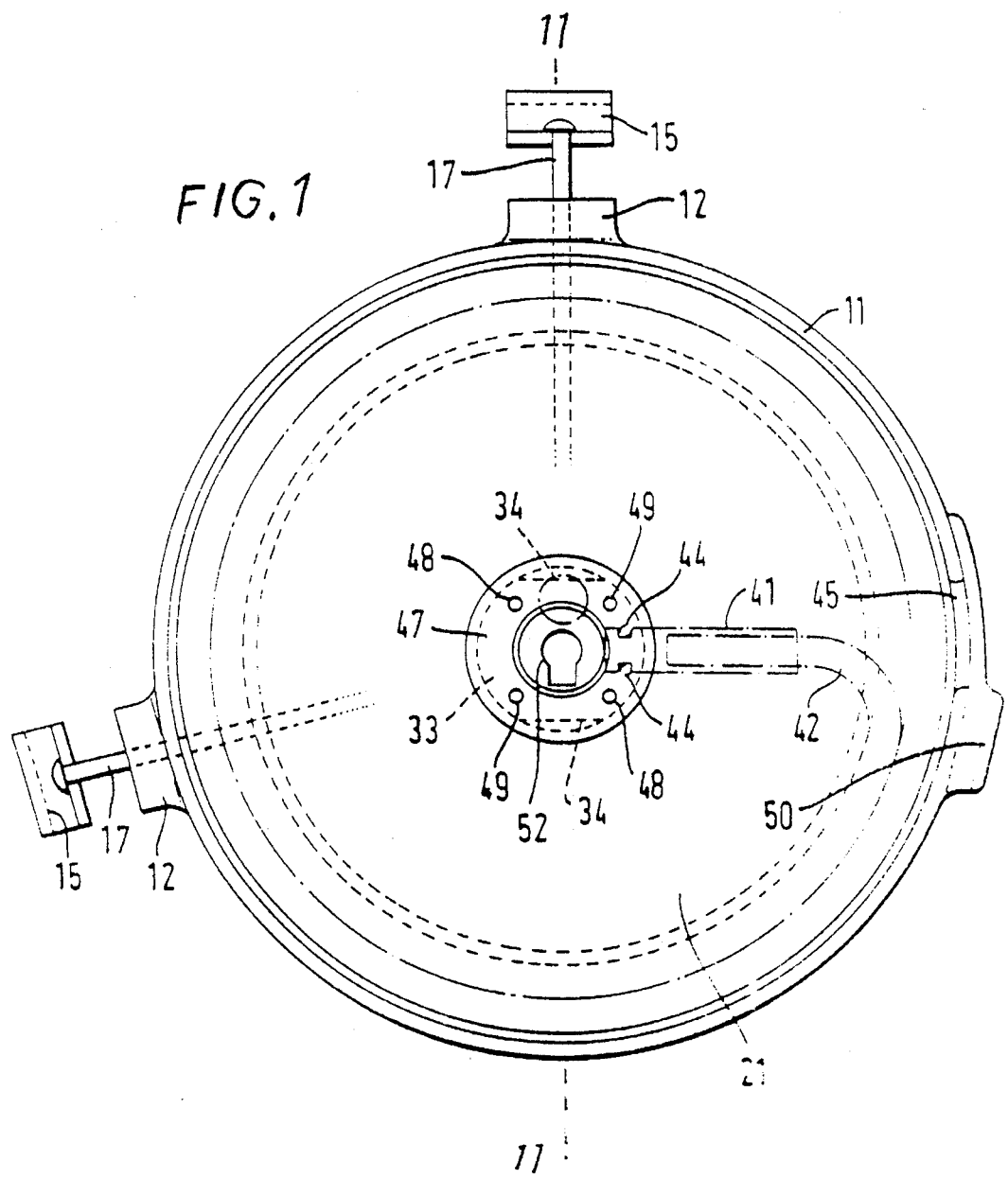
FIG. 1 is a front elevation of a bicycle lock fitted with an automatically-retractable wire or cable.
Figure 2:
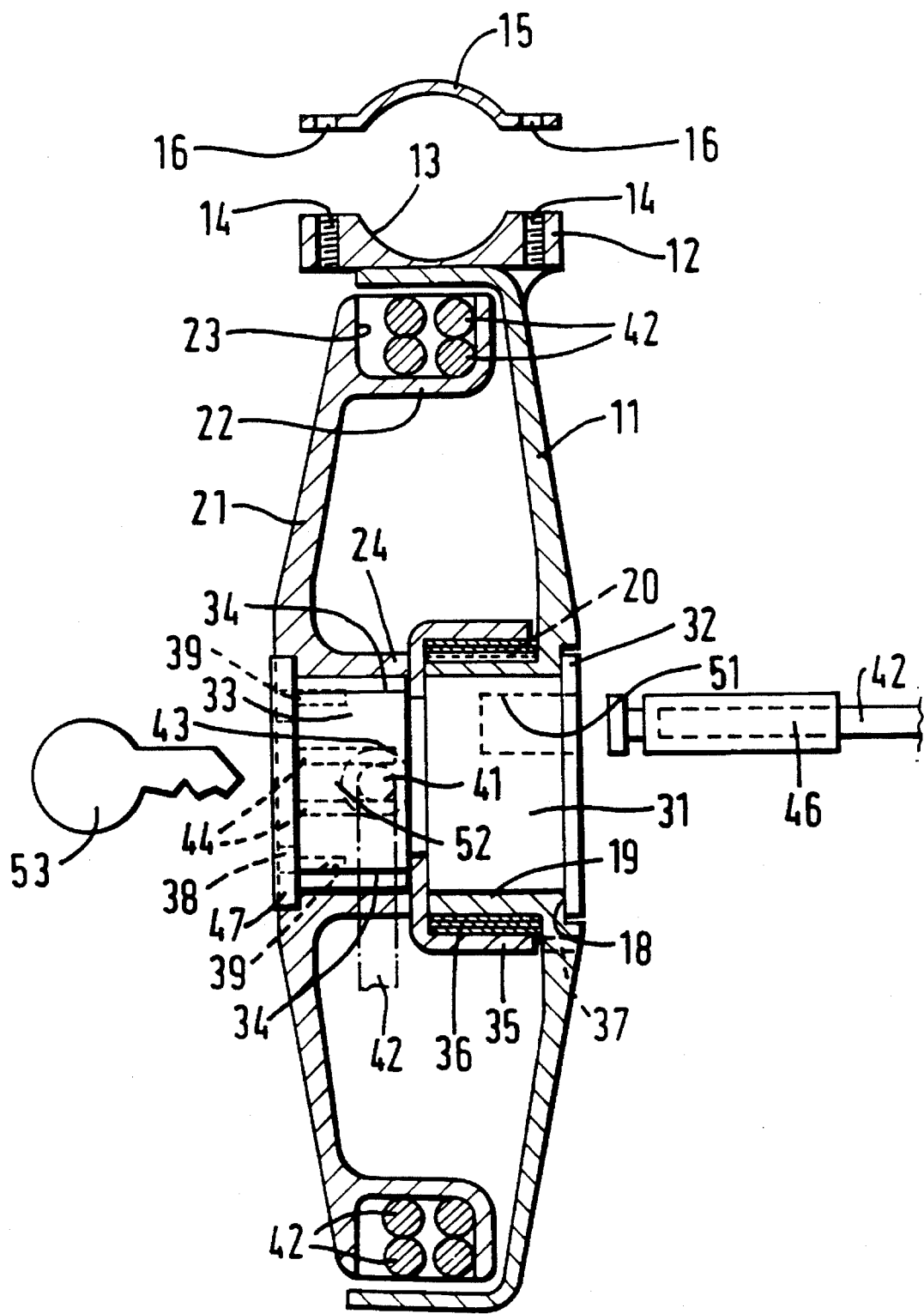
FIG. 2 is a section taken on the line II—II in FIG. 1 in the direction of the arrows but showing the free end of the wire or cable detached from the casing.
Figure 3:
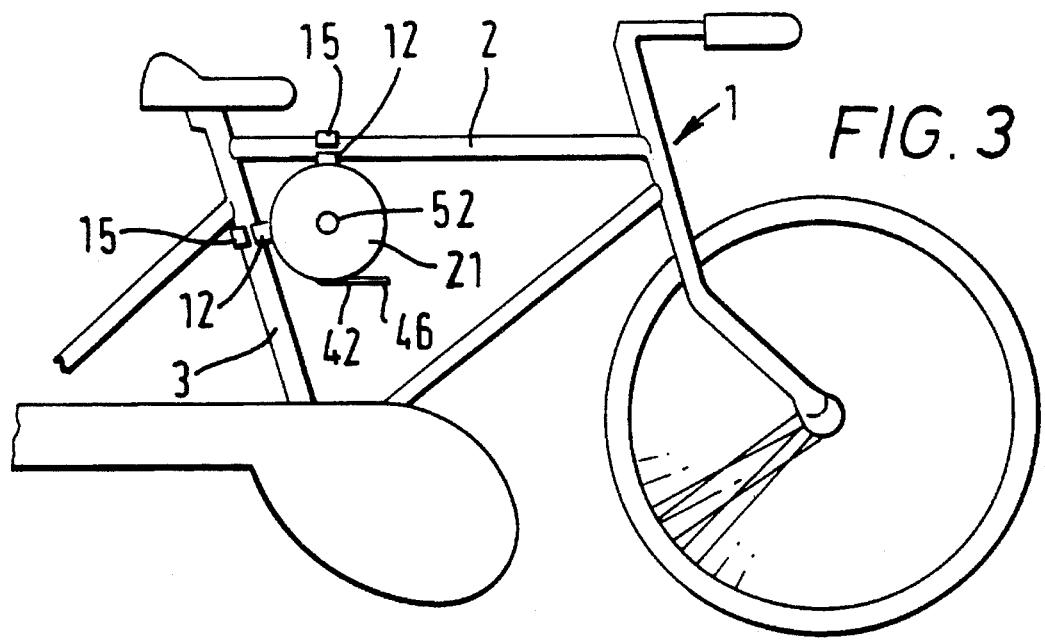
FIG. 3 is a diagrammatic illustration of a bicycle showing a lock according to the invention fitted thereto.

Reference will first be made to FIGS. 1 and 2 of the drawings in which a lock for a bicycle or the like comprises a substantially cylindrical cup-shaped first casing member 11 and a second casing member 21 which is adapted to fit into the first casing member. The first easing member 11 is provided on the outer surface of its wall with a pair of fittings 12 by means of which the casing member 11 can be secured to the frame members 2 and 3 of a bicycle 1 as shown in FIG. 3 of the drawings. As shown more clearly in FIG. 2, each fitting 12 has an arcuate depression 13 for mating with a bicycle frame member and a pair of screw-threaded bores 14 located one on each side of the depression 13. A respective curved strip 15 is arranged to mate with each fitting 12 with a bicycle frame member clamped between them and a pair of holes 16 near the ends of each strip 15 permit screws or bolts 17 to pass through the strips and engage with the screw-threads of the bores 14 to clamp the casing member 11 to a bicycle frame member.

The first casing member also has a circular aperture substantially in the centre of its base which is surrounded by a circular groove 18 in the base wall of the casing member 11. A cylindrical raised boss 19 extends into the casing member 11 from its base substantially co-terminous with the aperture.

The second casing member 21 takes the form of a substantially circular disc-shaped drum and is provided on its circular periphery with a flange 22 having a groove 23. The centre of the drum 21 has a circular aperture and a cylindrical boss 24 extends towards the first casing member 11 in the assembled condition of the lock as shown in FIG. 2.

A cylindrical lock assembly is adapted to be fitted to the casing member 11 the assembly comprising a cylindrical casing 31 which is designed to be received in the boss 19. The casing 31 has a peripheral flange 32 which is adapted to engage in the groove 18. The casing 31 is longer than the boss 19 and the portion 33 of the casing which projects beyond the end of the boss 19 is provided with a pair of flattened regions 34. A spring housing 35 containing a coil spring 36 is fitted over the boss 19 with the coil spring interposed between the boss 19 and the housing 35. One end of the coil spring 36 is attached to the housing 35 and its other end, which is free, is engaged in a slot 20 in a side wall of the boss 19. The edge of the spring housing is castellated and after the housing has been fitted over the boss 19 it is rotated with respect to the casing member 11 to pre-load the spring 36. The base of the spring housing 35 has an aperture through which the portion 33 of the lock casing 31 extends with flattened regions which are engaged with the flattened regions 34, once the spring 36 has been pre-loaded, to prevent relative rotation between the spring housing 35 and the lock casing 31. A pin 37 is inserted through a bore in the casing member 11 to engage with a slot in the castellated edge of the spring housing 35 to lock the spring housing against rotation relative to the casing member 11 while the lock is being assembled.

A slotted ferrule 41 is fined to one end of a wire or cable 42 and is passed through a slot in the boss 24 and is engaged in a bore 43 in the portion 33 of the lock casing 31. The ferrule is held in the bore 43 by a pair of pins 44 which are inserted into bores intersecting the bore 43 at right angles, the pins 44 engaging in the slot in the ferrule to hold the latter in position. The wire or cable 42 is then coiled round the drum 21 in the groove 23 and the other end of the wire or cable is passed through a slot 45 in the wall of the casing member 11 and terminates in a ferrule 46 which is similar to the ferrule 41. The boss 24 is then fitted over the portion 33 of the cylindrical lock casing 31 and the drum 21 is rotated to take in any play in the wire or cable 42. The drum is then secured in position by means of a nut 47 which is engaged with a screw-threaded extension 38 provided at the end of the portion 33 of the casing 31.

A pair of bores 39 is provided in the end of the portion 33 and the nut 47 is provided with a series of four bores 48 any opposed pair of which can be aligned with the bores 39. A pair of pins 49 are then inserted into the aligned bores 48 and 39 to prevent relative rotation between the nut 47 and the lock casing 31. The pin 37 is then withdrawn so that the spring housing 35 can rotate with the second casing member 21 and the lock casing 31.

The lock casing 31 is further provided with a closed bore 51 which is adapted to receive the ferrule 46 at the free end of the wire or cable 42 and a lock assembly 52 operated by a key 53 is located within the casing 31. The lock assembly is arranged, when turned by the key 53, to engage a groove in the ferrule 46 when the latter is engaged in the bore 51.

Turning the key in the opposite direction is effective to cause the lock to disengage from the ferrule 46 to permit the latter to be withdrawn from the bore 51.

FIG. 3 shows the lock illustrated in FIGS. 1 and 2 fitted to a bicycle frame. In order to lock the bicycle, the key 53 is operated to release the ferrule 46 from the bore 51 and the wire or cable 42 is then drawn out of the casing, against the action of the spring 36, and passed through one or both wheels of the bicycle and around an immovable object such as a lamp post, railings or the like. The ferrule 46 is then re-inserted into the bore 51 and the key 53 turned to lock the ferrule in the bore. The key is then removed from the lock and the owner can depart secure in the knowledge that his bicycle has been secured against theft. The spring 36 is coiled under tension and keeps the wire or cable 42 taut.

On return to the bicycle, the owner can unlock it by means of the key 53. As soon as the key is turned to cause the lock to release the ferrule 46, the spring 36 will rotate the drum of the casing member 21 to retract the wire or cable 42 into the cable casing. The slot 45 in the wall of the casing member 11 does not permit the ferrule 46 to pass through it so that the ferrule remains outside the casing. The ferrule may simply be left free in this position or the wire or cable 42 may be drawn slightly out of the casing and the ferrule 46 clipped into a moulding 50 provided on the wall of the casing member 21 in the region of the slot 45.

Figure 4:
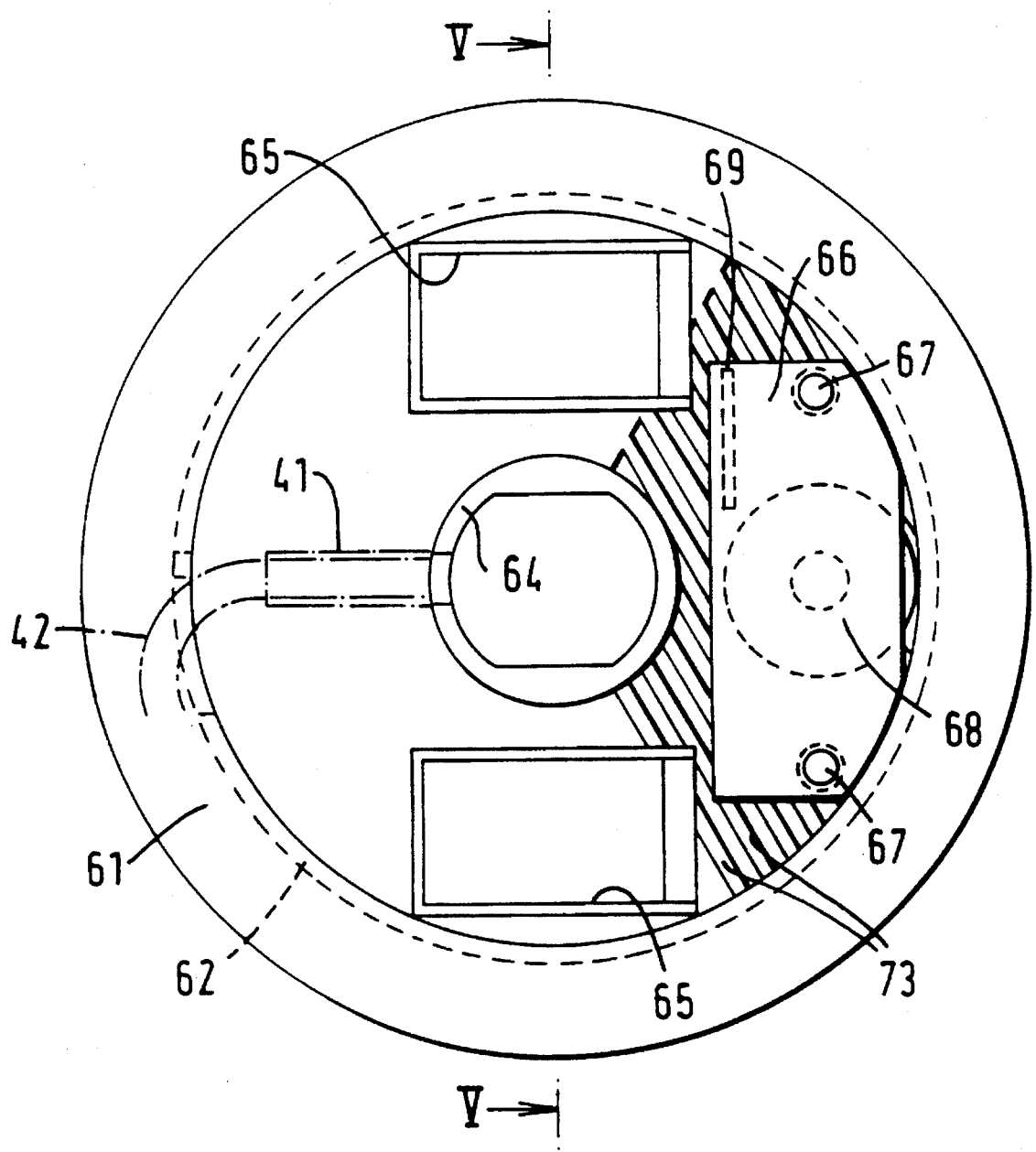
FIG. 4 is a front elevation of a casing member forming part of a first embodiment of a lock according to the invention.

A lock according to the invention will now be described in detail with reference to FIGS. 4 and 5 of the drawings in which the lock is fitted with an alarm device. In this embodiment, the second casing member takes the form of a substantially circular disc-shaped drum 61 provided on its circular periphery with a flange 62 having a groove 63 in a similar fashion to the casing member 21 shown in FIGS. 1 and 2. As with the lock shown in FIGS. 1 and 2, the centre of the drum 61 has a circular aperture and a cylindrical boss 64 extends towards the first casing member (not shown) in the assembled condition of the lock. In this ease, however, the drum 61 is provided with at least one recess 65 which is adapted to receive a battery (not shown). The or each recess 65 thus takes the form of a battery compartment which is electrically connected to an electronic circuit board 66 secured to the drum 61 by screws 67. Mounted on the circuit board 66 are a piezo alarm 68 and/or a zenon flasher 69. The or each battery compartment 65 is closed by a or a respective cover 71 which is secured in place by a screw 72. A series of slots 73 may be provided in the wall of the drum 61, as shown in FIG. 4, to form a grill through which light from the flasher 69 can be seen and to permit audible signals from the piezo alarm to be heard.

This embodiment is otherwise similar to the lock shown in FIGS. 1 and 2 except that, in this case, infra- red activation of the cylindrical lock assembly may be substituted for key operation. This arrangement enables the ferrule 46 to be released readily without the owner having to grope about, for example, in the dark to insert the key into the key hole. Once the lock mechanism has been set, either by means of a key or by infra-red means, the alarm will be activated to give a visual and/or audible warning if any attempt is made to remove the lock.

Figure 6:
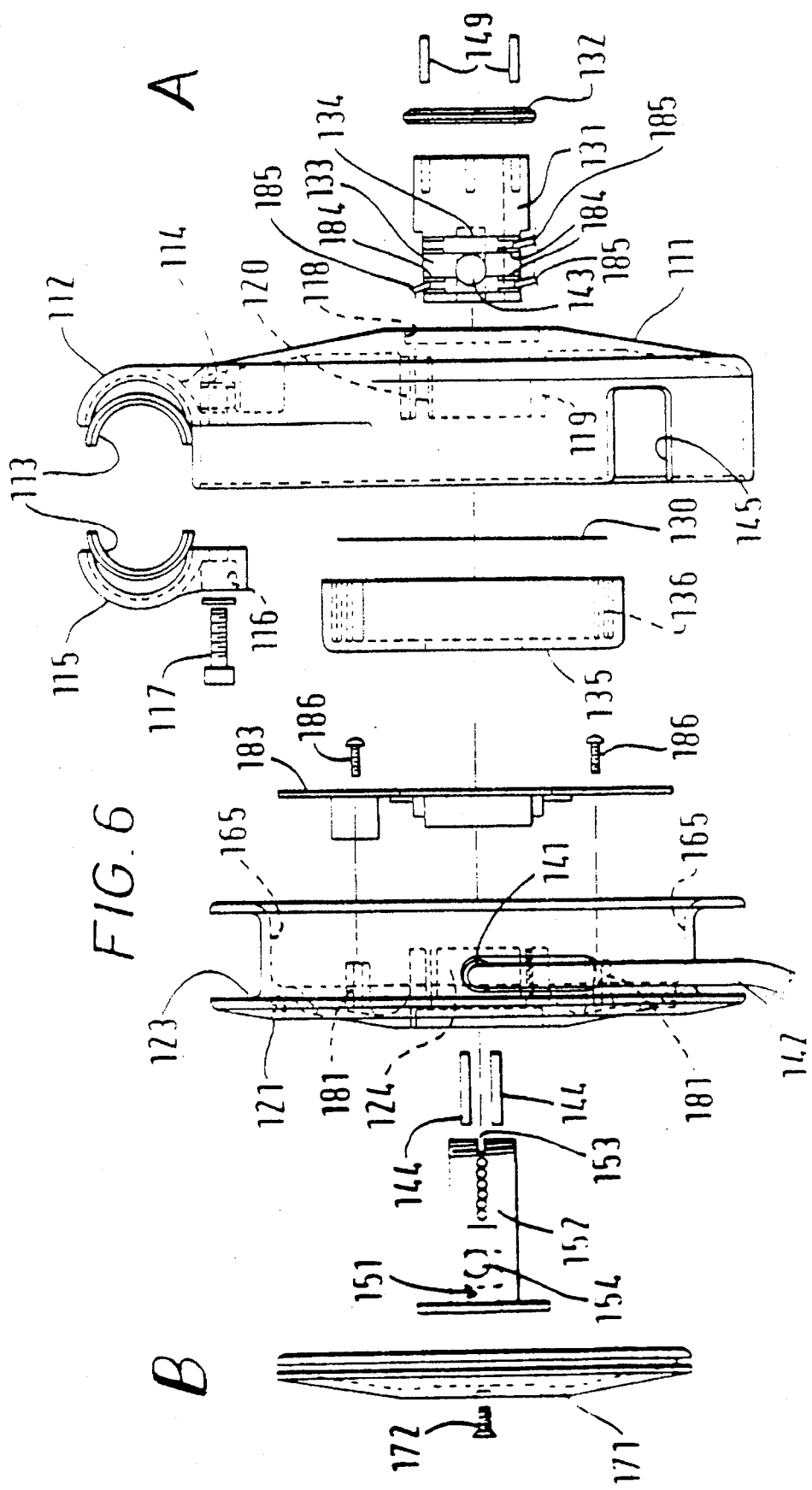
FIG. 6 is an exploded side elevation of a second embodiment of a lock according to the invention.

The embodiment shown in FIG. 6 of the drawings comprises a substantially cylindrical cup-shaped first casing member 111 and a second casing member 121 which is adapted to fit into the first casing member. As shown in FIG. 7, the first casing member is provided on the outer surface of its wall with a part tubular fitting 112 by means of which the casing member 111 can be secured to the down tube of a bicycle or the like such as the tube 3 of the bicycle shown in FIG. 3. The fitting 112 has an arcuate depression for mating with a bicycle frame member and a pair of screw-threaded bores 114. A clamp 115 is arranged to mate with the fitting 112 to clamp a bicycle frame member between them and a pair of holes 116 near the ends of the clamp 115 permit screws or bolts 117 to pass through the clamp 115 and engage with the screw-threads of the bores 114 to clamp the casing member 111 to a bicycle frame member. Packing pieces 113 in the form of strips of resilient material may be arranged to be clamped between the fitting 112 and the clamp 115 on the one hand and a bicycle frame member on the other hand and both the fitting 112 and the clamp 115 may be provided with arcuate slots or grooves to receive the packing pieces 113.

A circular aperture is provided substantially in the centre of the base of the casing member 111 which aperture is surrounded by a circular groove 118 and a raised boss 119 extends into the casing member 111 from the base thereof substantially co-terminous with the aperture.

A spring housing 135 containing a coil spring 136 is fitted over the boss 119 with the coil spring interposed between the boss 119 and the housing 135. One end of the coil spring 136 is attached to the housing 135 and its other end is engaged in a slot 120 in a side wall of the boss 119. A mylar washer 130 is interposed between the side of the coil spring 136 and the casing member 111. The barrel 131 of a cylindrical lock assembly is designed to be received in the boss 119 and has a portion 133 with flattened regions 134 which is designed to extend through an aperture in the base of the spring housing 135, said aperture having flattened regions which are designed to mate with the flattened regions 134 on the portion 133 of the lock barrel 131.

Figure 9:
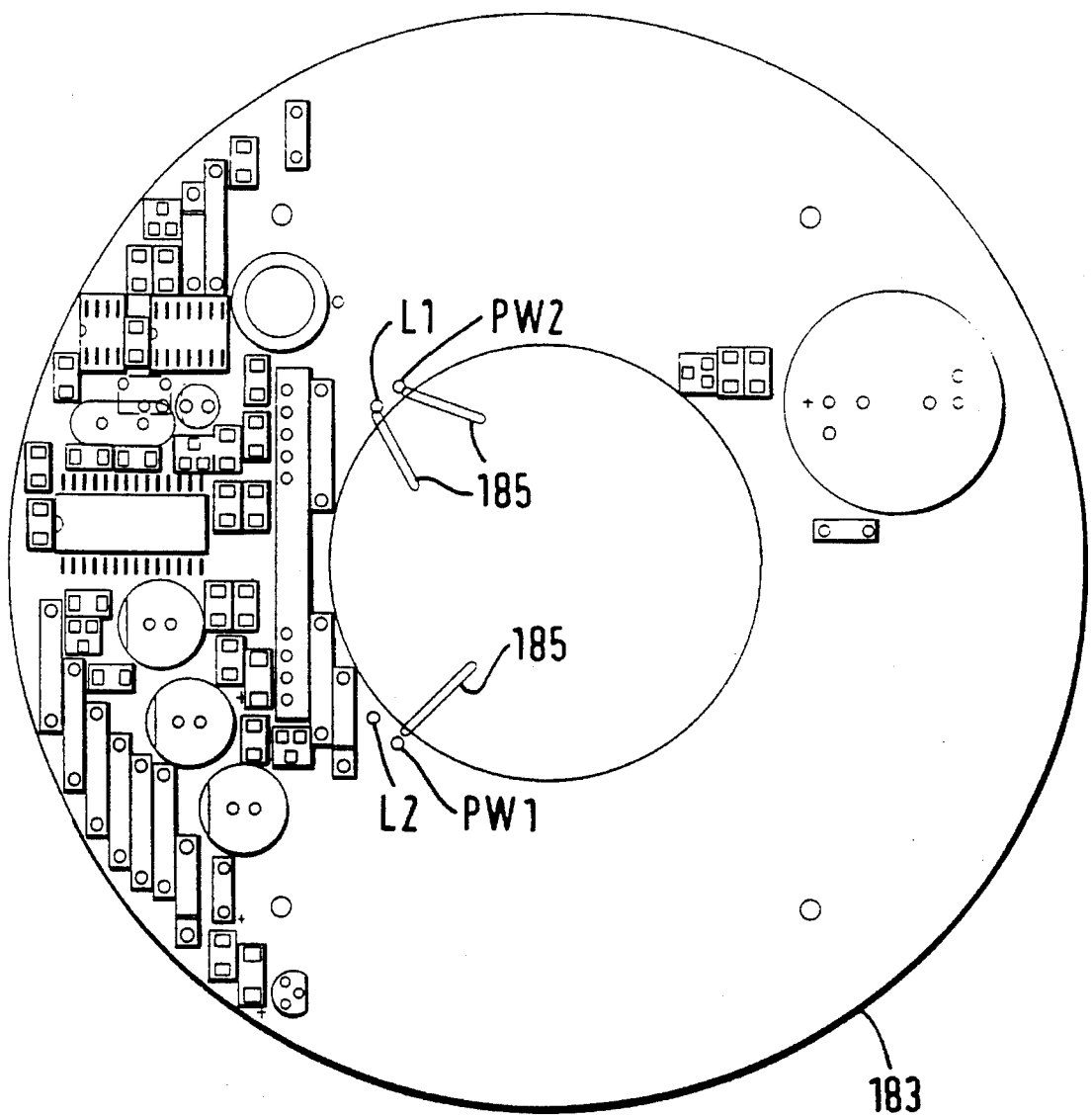
FIG. 9 is a view of a printed circuit board which is incorporated in the embodiment shown in FIGS. 6 to 8.
Figure 10:
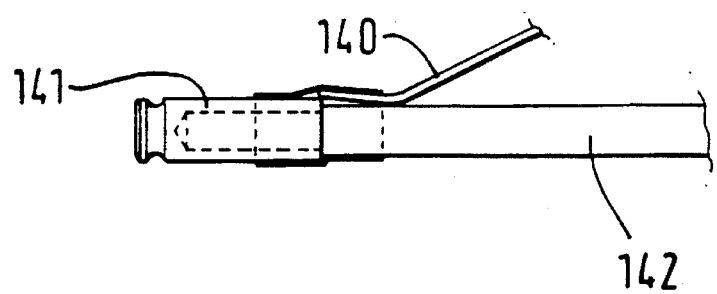
FIG. 10 shows a ferrule which is fitted to one end of a wire or cable for use with the embodiment shown in FIGS. 6 to 8.
Figure 11:
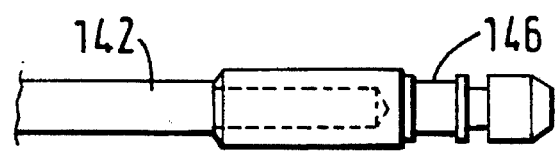
FIG. 11 shows a ferrule which is fitted to the other end of the wire or cable.

The second casing member 121 takes the form of a substantially circular disc-shaped drum and is provided in its circular periphery with a deep groove 123. The centre of the drum 121 has a circular aperture and a cylindrical boss 124 extends towards the first casing member 111. A series of four posts 181 (only two shown) having screw-threaded bores also extend from the base of the drum 121 towards the first casing member 111. Electrical contacts 184 on the lock barrel 131 are connected by wires 185 (see FIG. 9) to terminals L1, PW1 and PW2 on a printed circuit board 183. The board is secured to the drum 121 by screws 186 which engage in the screw-threaded bores in the posts 181.

The cylindrical boss 124 has a bore with flattened regions and is adapted to fit over the portion 133 of the lock barrel 131 with the flattened regions of the bore in the boss 124 mating with and engaging the flattened regions 134 of the portion 133 of the barrel 131. Once the drum 121 has been fitted to the casing member 121 by engaging the boss 124 on the portion 133 of the lock barrel 131, said drum is rotated with respect to the casing cover to tension the coil spring 136. Ideally, the drum should be rotated through six full turns and is then held in position while a slotted ferrule 141 fitted to one end of a steel cable assembly 142 is passed through a slot 145 in the wall of the casing member 111, through an aperture in the base of the groove 123 and is engaged in a bore 143 in the portion 133 of the lock barrel 131. The ferrule is held in the bore by a pair of pins 144 which are inserted into bores intersecting the bore 143 at right angles, the pins 144 engaging in the slot in the ferrule to hold the latter in position. The drum 121 can then be allowed to rotate to coil the cable around the drum in the groove 123. The ferrule 141 is electrically connected by a wire 140 to the contact L2 of the printed circuit board 183 e.g. by soldering.

A lock assembly 152 is fitted into the drum 121 to engage the pins 144 and to be received in the lock barrel 131. The lock assembly 152 and lock barrel 131 are secured in position by a locking ring 132 which engages in the groove 118 in the casing member 111 and which is held in position by pins 149. The lock assembly 152 has a key hole slot 153 at one end for the reception of a key (not shown) from the side of the casing member 111. A bore 151 extends into the assembly 152 from its other end and is adapted to receive a slotted ferrule 146 on the other end of the cable assembly 142. A spring-loaded plunger 154 projects into the bore 151 and is adapted to engage in the slot in the ferrule to hold the ferrule in position in the bore.

The ferrule can then only be removed from the bore by inserting a key into the lock assembly 152 and turning the key to retract the plunger 154.

Figure 5:
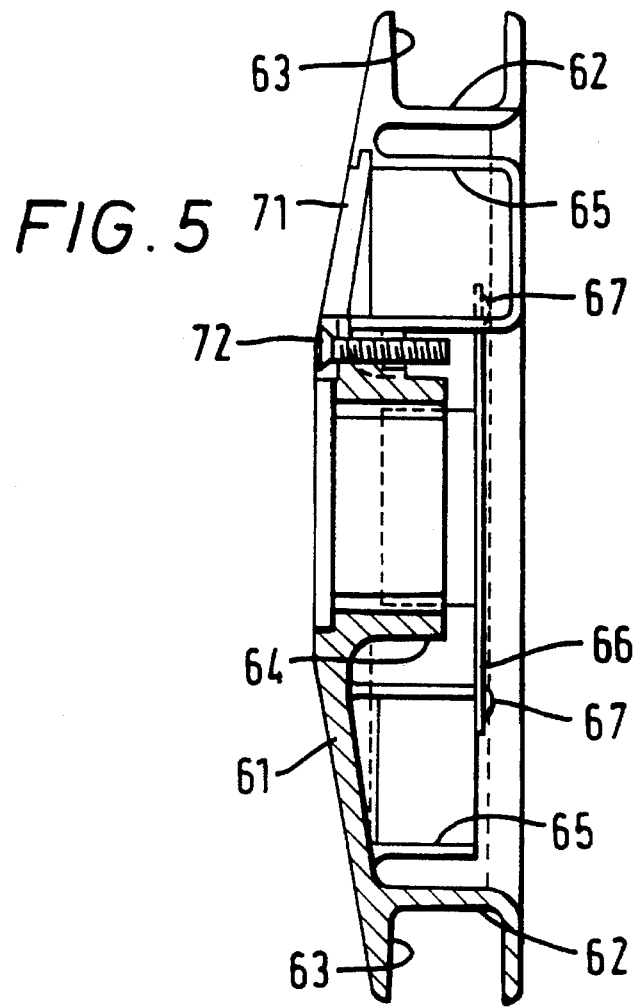
FIG. 5 is a section taken on the line V—V in FIG. 4.
Figure 12:
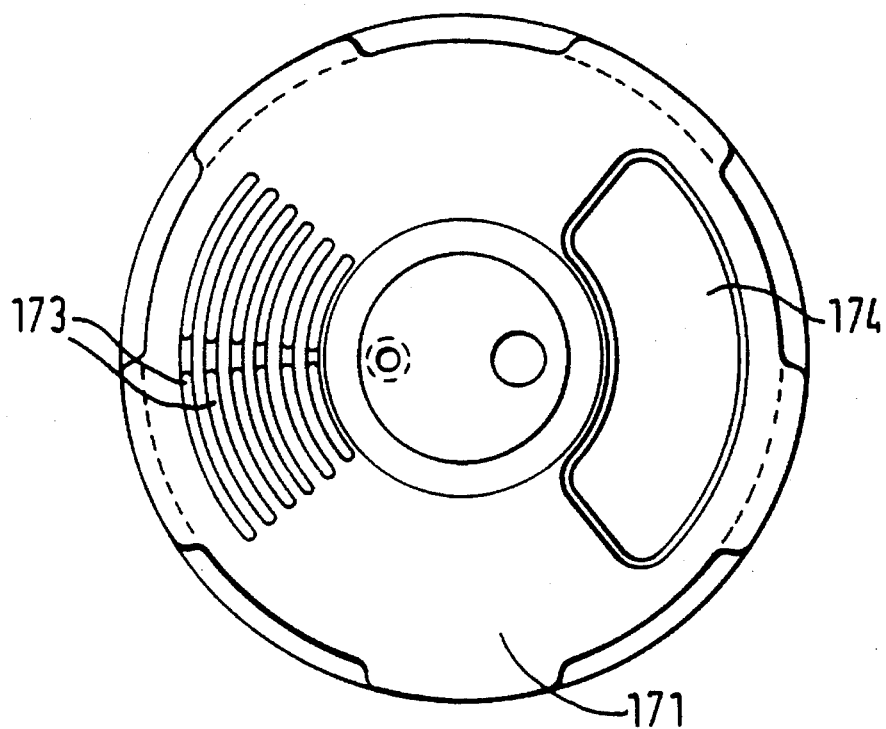
FIG. 12 shows a cover which is intended to be fitted to the cable drum shown in FIG. 8.

In a similar manner to the embodiment shown in FIGS. 4 and 5, the embodiment shown in FIGS. 6 to 9 is also fitted with an alarm device. The drum 121 is provided with a pair of compartments 165 for receiving batteries as well as a piezo alarm 168 with a zenon flasher 169. The compartments, alarm and flasher are closed by a cover 171 which is secured to the drum 121 by a screw 172. As shown in FIG. 12, the cover 171 is provided with a series of arcuate slots 173, to permit audible signals from the piezo alarm to be heard, as well as a window which is filled by a plate 174 of transparent material through which light from the flasher can be seen. The underside surface of the plate is desirably patterned to give a magnifying effect to the flasher and the flasher desirably comprises three red-coloured lamps.

The cable 142 preferably takes the form of a multi-core steel cable having at least six strands. The cable may surround an inner core of a good electrical conductivity such as copper so that when the ferrule 146 is inserted into the bore 151 of the lock assembly 152 an electrical circuit is completed.

The printed circuit board incorporates a circuit which is capable of arming the alarm 168 and the flasher 169 when the ferrule 146 is inserted into the bore 151. The circuit is also capable of arming the alarm and flasher by remote infra-red operation and the remote control device may be incorporated into a key fob.

In order to lock a bicycle or the like fitted with the lock shown in FIGS. 6 to 12, the cable 142 is first drawn out of the cable drum and passed through one or both wheels and around an immovable object such as a lamp post or railings as before and the ferrule 146 is inserted into the bore 151. The lock can then be armed by depressing an infra-red control button on the key fob for a second. The warning lamps will flash and the audible alarm will beep to acknowledge that the key code has been successfully received. During this acknowledgement, a red warning LED will also be lit. The warning LED is also arranged to flash intermittently while the lock is armed.

If, while the lock is in its armed state, the cable 142 is cut, the circuit is arranged to set off the alarm which will operate continuously with the piezo alarm 168 giving an audible warning and the flasher 169 giving a visual warning. If on the other hand, the lock is moved, the alarms will be activated by a vibration switch for about ten seconds. While the unit is in its "alarm" state, it will not accept a de-activation signal from the infra-red remote controller. If the alarm has been activated by the vibration switch, it will cease approximately ten seconds after its last detected vibration and revert to the armed state. However, if the alarm has been set off because the cable has been cut it will continue to sound until the batteries are exhausted or power is removed.

The lock can be disarmed by activating the remote infrared control for about a second. The warning light will flash and the audible alarm will beep to acknowledge that the key code has been successfully received. If the battery state is low, the acknowledge state is followed by a series of short warning beeps to advise the owner that fresh batteries are needed. The ferrule 146 can then be withdrawn from the lock casing by means of the key. The spring 136 will then act on the steel cable assembly 142 to retract the cable into the casing 111 by being wound round the inner casing member 121 in the groove 123. The ferrule 146 is of such a size that it cannot pass through the slot 145 in the wall of the casing member 111.

It will be seen that the lock according to the invention provides a ready and convenient means for preventing, or at least deterring, the theft of bicycles and the like. The wire or cable is preferably made substantial, at least 6 mm thick, and is desirably coated with a plastics material such as PVC to render it convenient to use and easy to keep clean. The self-retracting action of the wire or cable makes it convenient to use and eliminates stowage problems when the lock is not in use.

The invention is not restricted to the above-described embodiments but variations and modifications are possible without departing from the scope of the invention. For example, although in the embodiment shown in FIGS. 4 to 5 two fittings are shown for securing the casing to a bicycle frame, only one fitting need be provided as shown in FIGS. 6 and 7 although the provision of a second fitting enables the casing to be fitted more securely to a bicycle frame. Further, in the embodiments shown in FIGS. 4 and 5 and 6 to 12, only one battery compartment can be provided for a single battery.

Moreover, the lock according to the invention is not restricted to use with bicycles but is also suitable for use with other vehicles such as tricycles or quadricycles or even carts as well as motorcycles, motorcycle combinations, mopeds and scooters.

What is claimed is:

1. A lock for a bicycle, said lock comprising:

a first fixed casing member adapted to be secured to a frame member of a bicycle and a second casing member which is movable relative to said first casing member;

said first casing member being cup-shaped having a base and a cup wall, wherein frame member mounting means are provided on an outer surface of said cup wall and a raised boss extends from said base at a central region thereof, wherein said second casing member is adapted to fit into said first casing member and to engage with said raised boss in such a manner that said second casing member is rotatable with respect to said first casing member;

a wire cable, one end of which is secured to said second casing member and said wire cable then being wound around said second casing member when said lock is not in use, the other end of said wire cable extending through a slot in said cup wall of said first casing member;

locking means being provided with which said other end of said wire cable is engageable; and retracting means being provided whereby said second casing member is arranged to rotate with respect to said first casing member to draw said wire cable into said first casing member by being wound round said second casing member as the latter is rotated by said retracting means, wherein said wire cable is arranged to complete an electric circuit when said other end of said wire cable is engaged in said locking means and wherein said lock is provided with an alarm means with an annunciator selected from the group including audible and visual alarms, said alarm means activated by vibration for only a limit pre-set period of time if attempts are made to move said lock and to be activated continually if said wire cable is cut.

2. A lock according to claim 1, wherein said raised boss is formed integrally with said first casing member and wherein said locking means are located within said raised boss, said locking means being desirably arranged to be operated by a key.

3. A lock according to claim 1 wherein said retracting member comprises a coil spring which is attached at one end to said raised boss, is wound round said raised boss and is attached at its other end to said second casing member.

4. A lock according to claim 1, wherein said second casing member comprises a circular disc provided with a peripheral flange around which said wire cable can be wound.

5. A lock according to claim 4, wherein said circular disc has a central region provided with a second casing member raised boss which is engageable with said locking means.

6. A lock according to claim 1, wherein said lock is adapted to be activated by a remote infra-red source.

7. A lock according to claim 1, wherein said wire cable consists of a plurality of strands and is provided with a central core consisting of a material which is a good conductor of electricity.

* * * * *